United States Patent Office.

GIDEON O. SPENCE, OF TITUSVILLE, PENNSYLVANIA, ASSIGNOR TO HIMSELF, A. R. WILLIAMS, AND J. S. LATHROP, OF SAME PLACE.

Letters Patent No. 76,838, dated April 14, 1868.

IMPROVED LUBRICATING-OIL.

*The Schedule referred to in these Letters Patent and making part of the same.*

TO ALL WHOM IT MAY CONCERN:

Be it known that I, GIDEON O. SPENCE, of the city of Titusville, county of Crawford, and State of Pennsylvania, have invented certain new and improved Lubricating-Oils; and I do hereby declare that the following is a full, clear, and exact description thereof, from which any person skilled in the art may be able to compound the same.

My invention consists of an improved quality of lubricating-oil, which I manufacture from crude petroleum or coal-oil, or their products, as a base, with the addition of certain chemical ingredients hereinafter mentioned.

In the following description of my method of preparing my lubricating-oil, I have, for the sake of convenience, assumed that it is to be prepared from the residuum of crude petroleum (or result of distillation) of a gravity of 30° Baumé, or thereabouts. If the lubricating-oil is to be made directly from crude petroleum, or coal-oil of a lighter or heavier gravity, it may be first reduced to the assumed gravity of 30°, or the proportions of chemicals may be slightly varied to suit the gravity of the base used, as hereinafter specified.

When using oil or residuum, of a gravity of 30°, or thereabouts, I first run the same into a receiver, in which has been placed a quantity of chloride of sodium (or any of the equivalent haloid salts) as a solvent, in the proportion of about one pound to each forty gallons. I heat the same to about 150° Fahrenheit, or sufficiently to thoroughly mix the ingredients, and decant into a second receiver, where I add hydrated potassa, or any alkali of the same or similar chemical and electrical action, as a solvent, to the amount of about one pound to forty gallons. I then add muriate of ammonia, or any of the equivalent hydrosalts, as a saponifier, in the proportion of about two pounds to forty gallons, and decant to a third receiver, where I add spirits of turpentine, linseed-oil, or oil of like solvent property, as a solvent and deodorizer, in proportion of about one gallon to three hundred. I also add flour of sulphur, in the proportion of about one pound to forty gallons, to destroy cohesion or tenacity. Sufficient heat should be applied during the process to thoroughly mix the ingredients.

When treated according to the above description, the manufactured oil retains perfect fluidity at a temperature of zero, while lard and other animal lubricating-oils congeal in winter at a temperature of 32°, or above.

For spring, summer, and autumn use, and for use in warm climates, I should, ordinarily, use only two of the above chemicals, namely, hydrated potassa and muriate of ammonia, or their equivalents, adding the others above named, as the peculiarities of the trade may require.

The proportions of the chemicals given above are by no means arbitrary; as, for instance, the use of double the given quantity of either would probably do no positive harm, while a less quantity would suffice in some instances, but the proportions given are such as I deem sufficient and best in practice. They will depend somewhat upon the gravity of the base used, as well as the gravity and quality required for the manufactured oils, said proportions being somewhat greater or less, as the gravity of the base used may be lower or higher than that assumed, (30°;) but from the above description any skilled chemist or manipulator of oils will be enabled to judge of the amount of variation in proportion required in practice.

For the sake of convenience in future reference, and also for reference in my appended claims, I have designated the chemical ingredients used in manufacturing my lubricating-oils by numbers, and in the order in which they are named above, as follows:

First. Chloride of sodium, or any of the haloid salts used as a solvent.

Second. Hydrated potassa, or any alkali of the same or similar chemical and electrical action, also used as a solvent.

Third. Muriate of ammonia, or any one of the hydrosalts. This serves as a saponifier, and renders the oil less combustible.

Fourth. Spirits of turpentine, linseed-oil, or oil of like solvent property. Used as a solvent and deodorizer.

Fifth. Flour of sulphur, to destroy cohesion or tenacity.

Having thus described my method of preparing my oils, and the ingredients used, what I claim as my invention, and desire to secure by Letters Patent, is—

1. As a new article of manufacture, a lubricating-oil, made from petroleum or coal-oil, or their products, as a base, combined with the second and third chemical ingredients herein specified, for the purposes set forth.

2. As a new article of manufacture, a lubricating-oil, made from petroleum or coal-oil, or their products, as a base, combined with the five chemical ingredients herein specified, for the purposes set forth.

GIDEON O. SPENCE.

Witnesses:
    ANDREW B. HOWLAND,
    J. J. HOLDEN.